United States Patent [19]

Willis et al.

[11] Patent Number: 5,505,466

[45] Date of Patent: * Apr. 9, 1996

[54] CYLINDER HEAD GASKET WITH RETAINING RING AND SPRING SEAL

[75] Inventors: Harry G. Willis, Coal City, Ill.; Mark M. Shuster, Toledo, Ohio

[73] Assignee: Dana Corporation, Toledo, Ohio

[ * ] Notice: The portion of the term of this patent subsequent to Aug. 16, 2011, has been disclaimed.

[21] Appl. No.: 56,149

[22] Filed: Apr. 30, 1993

Related U.S. Application Data

[63] Continuation-in-part of Ser. No. 992,678, Dec. 18, 1992, Pat. No. 5,388,046.

[51] Int. Cl.⁶ .................................................. F16T 15/06
[52] U.S. Cl. .......................................... 277/180; 277/235 B
[58] Field of Search ..................................... 277/180, 233, 277/235 B, 235 A, 236, DIG. 6

[56] References Cited

U.S. PATENT DOCUMENTS

| | | |
|---|---|---|
| 2,129,844 | 9/1938 | Kiefer . |
| 2,156,662 | 5/1939 | Wills . |
| 2,299,813 | 10/1942 | Franks . |
| 3,519,278 | 7/1970 | Fuhrmann et al. . |
| 3,531,133 | 9/1970 | Sheesley et al. . |
| 3,561,793 | 2/1971 | Rode . |
| 3,618,960 | 11/1971 | Koehler . |
| 3,722,898 | 3/1973 | von Benningser . |
| 3,820,799 | 6/1974 | Abbes et al. . |
| 3,917,294 | 11/1975 | Abbes et al. . |
| 4,114,907 | 9/1978 | Abbes et al. . |
| 4,188,037 | 2/1980 | Abbes et al. . |
| 4,369,980 | 1/1983 | Backlin . |
| 4,518,168 | 5/1985 | Belter . |
| 4,716,005 | 12/1987 | Ezelcoye et al. ................... 277/180 |
| 4,795,174 | 1/1989 | Whitlow . |
| 4,810,454 | 3/1989 | Belter . |
| 4,860,567 | 8/1989 | Askey et al. . |
| 5,033,426 | 7/1991 | Reichenbach et al. . |
| 5,076,592 | 12/1991 | Pearlstein . |
| 5,201,534 | 4/1993 | Miyaoh . |
| 5,203,849 | 4/1993 | Balsells . |
| 5,234,048 | 8/1993 | Seike et al. . |
| 5,275,139 | 1/1994 | Rosenquist . |
| 5,277,433 | 1/1994 | Ishikawa et al. . |
| 5,277,434 | 1/1994 | Kestly et al. . |
| 5,338,046 | 8/1994 | Willis, Jr. et al. .................. 277/235 B |

FOREIGN PATENT DOCUMENTS

| | | |
|---|---|---|
| 42945 | 12/1975 | Japan . |
| 227853 | 9/1989 | Japan . |
| 1273407 | 5/1972 | United Kingdom . |

OTHER PUBLICATIONS

EnerSeal Spring Energized Polymer Seals, Design Manual of The Advanced Products Company, Incorporated (no date given).
Helicoflex® High Performance Sealing, Manual (no date given).
William F. Smith: "Structure and Properties of Engineering Alloys"; ©1981; pp. 411, 451–455.

Primary Examiner—Daniel G. DePumpo
Attorney, Agent, or Firm—Dykema Gossett

[57] ABSTRACT

A multiple sealing system for an engine gasket utilizes a retaining ring and a spring energized seal disposed within an annular U-shaped flange adjacent a gasket body. The spring energized seal acts as a primary seal against combustion gases under all engine operating conditions. The retaining ring acts as a positive mechanical stop for the spring energized combustion seal, protects the spring energized combustion seal from thermally induced crushing, and acts as a secondary seal against combustion gases. The U-shaped flange positions and supports the seals relative to the gasket body.

3 Claims, 1 Drawing Sheet

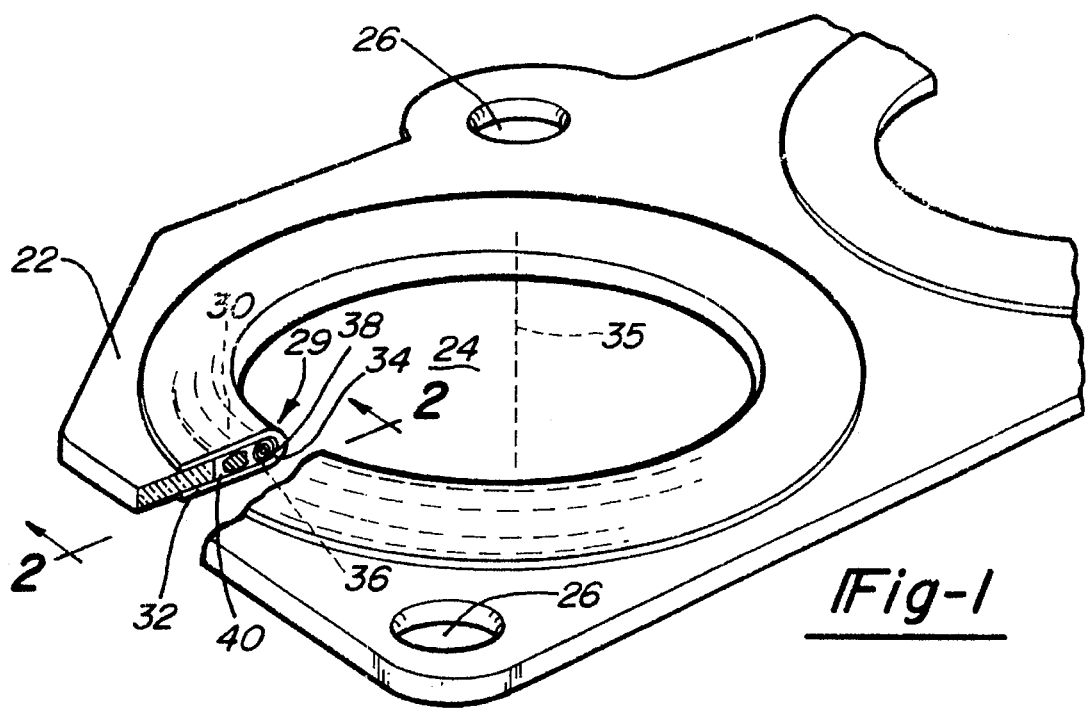
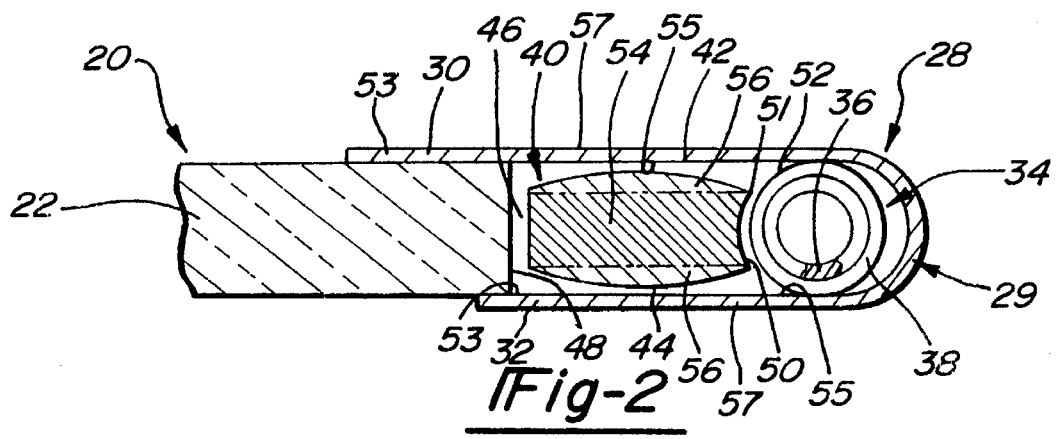
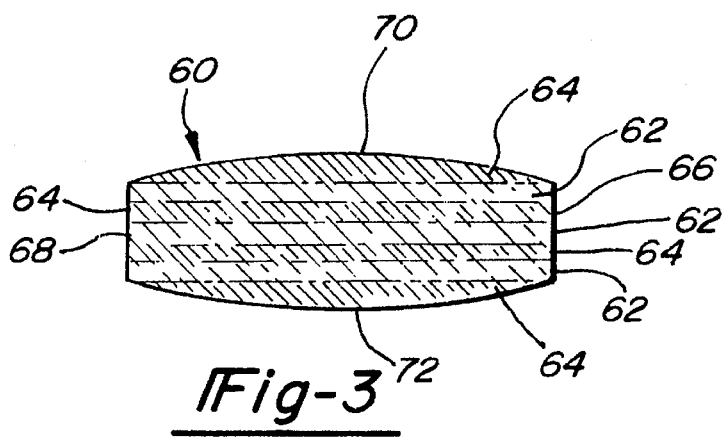

CYLINDER HEAD GASKET WITH RETAINING RING AND SPRING SEAL

This application is a continuation-in-part of application Ser. No. 07/992,678, filed Dec. 18,1992 now U.S. Pat. No. 5,338,046.

BACKGROUND OF THE INVENTION

The present invention relates to an engine cylinder head gasket utilizing a retaining ring and a spring energized seal disposed within an annular U-shaped flange adjacent a gasket body.

A cylinder head gasket bears a clamping load from a bolted connection between a cylinder head and an engine block and relies upon that load to provide a seal against the sealing elements of the gasket. The gasket includes a combustion seal to prevent the leakage of combustion gases during engine operation.

Known gaskets use any of several types of combustion seal rings. One type, known as a yieldable combustion seal ring, is essentially comprised of a wire having a generally circular cross-sectional area. A clamping force applied to such a ring is concentrated at the point of contact, deforming the ring's circumference to effectively seal out combustion gases. This type of seal ring, however, is subject to thermal crushing which produces additional plastic deformation that tends to occur under high temperature operation during the life of the ring.

Other known gaskets use a spring energized seal. The spring energized seal extends about the cylinder bore and defines an annulus. The seal has a generally circular cross-section and comprises both an outer jacket and an inner spring. As with the yieldable combustion seal ring, a clamping force applied to such a ring is concentrated at the point of contact to seal out combustion gases. The spring energized seal requires only a low load before sealing out combustion gases, which is of particular importance in a cold engine start up condition. Such a spring energized seal, however, is also subject to thermal crushing. Further, the spring energized seal tends to roll or pivot about its annular axis in use, leading to undesirable fatigue under certain circumstances.

SUMMARY OF THE INVENTION

An improved combustion sealing system for a cylinder head gasket of an engine comprises a pair of seals. An inner annular spring energized combustion seal is used in combination with an outer annular retaining ring, both of which are disposed within an annular metal wrap and centered about an axis.

The spring energized seal acts as a continuous or primary seal against combustion gases under all engine operating conditions. The retaining ring is disposed between the spring energized combustion seal and a gasket body. The retaining ring provides a positive mechanical stop for the spring energized combustion seal and provides a secondary seal against combustion gases. The retaining ring also protects the spring energized combustion seal from thermal crushing. The metal wrap is typically a generally U-shaped flange which positions the seals relative to the gasket body.

Preferably, the retaining ring is positioned radially outwardly of the spring energized seal and includes a radially elongate cross-section having convex top and bottom surfaces so that an initial load applied to the retaining ring is a point load. Faces are formed at the radial extremities of the retaining ring having an orientation that is generally parallel to the axis about which the retaining ring is centered. In one preferred embodiment, a face at the radially inner extremity includes a groove adapted to receive an outer periphery of a spring energized combustion seal. The use of the groove increases surface contact between the ring and the energized combustion seal which avoids point loading of the spring energized seal in the radial dimension.

The ring is formed from a homogeneous composite powdered metal which contains zones of varying densities after sintering. In one preferred form, the powdered metal is composed primarily of titanium.

BRIEF DESCRIPTION OF THE DRAWINGS

The features and inventive aspects of the present invention will become more apparent upon reading the following detailed description, claims, and drawings, of which the following is a brief description:

FIG. 1 is a perspective view of a portion of a gasket incorporating the present invention.

FIG. 2 is a cross-sectional view along lines 2—2 of the gasket of FIG. 1 which depicts a first embodiment of a first embodiment of a retaining ring constructed in accordance with the present invention.

FIG. 3 is a cross-sectional view of a second embodiment of a retaining ring.

DESCRIPTION OF A DETAILED EMBODIMENT

An engine cylinder head gasket 20 illustrated in FIGS. 1 and 2 includes a gasket body 22, cylinder apertures 24, and fluid flow openings 26. To provide a multiple sealing system 28 about a cylinder bore (not shown), gasket 20 includes an annular U-shaped wrap or flange 29 with an upper leg 30 and a lower leg 32. An annular spring energized seal 34 is disposed within the flange. Spring energized seal 34 is centered about an axis 35 and defines an annulus. Spring energized seal 34 comprises both an inner coil spring 36 and an outer hollow spring or jacket 38, and acts as a primary seal against combustion gas leakage. A retaining ring 40, radially disposed between the spring energized combustion seal 34 and gasket body 22, and also centered about axis 35, acts as a positive mechanical stop for spring energized combustion seal 34. Retaining ring 40 provides a secondary seal against combustion gas leakage.

As illustrated in FIG. 2, retaining ring 40 defines a radially elongate cross-section having a convex top surface 42 and a convex bottom surface 44. A radially outer circumferential face 46 defines an extremity which is perpendicular to the radial direction, and corresponds to a mating surface 48 of gasket body 22. A generally circular concave groove 50 is formed on a face 51 that defines a radially inner extremity of retaining ring 40 to correspond to and receive a mating outer convex peripheral surface 52 of spring energized combustion seal 34.

Retaining ring 40 provides support to spring energized combustion seal 34, aiding in maintaining spring energized seal 34 in position. Retaining ring 40 and in particular, circular concave groove 50, resists movement by spring energized seal 34 during assembly. Concave groove 50 also limits pivoting or rolling by spring energized seal 34 about its annulus, resulting otherwise in undesirable fatigue. Stresses imparted to retaining ring 40 include both a radial stress and a hoop stress from the spring energized seal 34. The shape of groove 50 in conjunction with mating surface 52 is preferably chosen to place spring energized seal 34 radially in line with retaining ring 40 and to provide a slight interference fit between the two parts. Such a radially in line relationship distributes radial and hoop induced loads over a maximum surface area, lowering the corresponding stresses. One preferred ratio between a radial dimension of retaining ring 40 measured between faces 46 and 51 at the radial extremities, and a thickness measured between convex surfaces 42 and 44 is approximately three to one. This ratio assures the necessary hoop strength to resist the externally applied pressure of the internal combustion forces.

Spring energized seal 34 has a circular cross section while retaining ring 40 has convex top surface 42 and convex bottom surface 44. As a result, an initial axial compressive load applied to spring energized seal 34 and retaining ring 40 is a point load. Deformations of the spring energize seal 34 and retaining ring 40 will compensate for surface variations to provide conformability and a superior combustion seal. Both the spring energized seal 34 and the retaining ring 40 deform plastically upon initial loading. Thereafter, during the thermal cycles which occur over their useful life, each will deform elastically. However, during the latter, further plastic deformation is not precluded. Because of the shape and size of retaining ring 40, excessive thermally induced crush of spring energized seal 34 is prevented. A primary advantage of spring energized seal 34 is that it requires only a low load before sealing out combustion gases. With non-liner engine applications, spring energized seal 34 is of particular importance under cold engine start up conditions. However, even with liner-engine applications, the spring energized seal 34 limits seal leakage, particularly under hot operating conditions when engine components may warp.

Flange 29 plays an important role in the proper operation of spring energized seal 34 and retaining ring 40. Flange 29 must be sufficiently strong to maintain proper orientations of retaining ring 40 and seal 34, particularly for limitation of rolling or pivoting of spring energized seal 34. Preferably, outer convex surfaces 42 and 44 of retaining ring 40 and outer peripheral surface 52 of spring energized seal 34 abut and are supported by an inner surface 55 of one of legs 30 or 32 of flange 29.

In one preferred embodiment, flange 29 comprises a nickel stainless steel such as that sold under the registered tradenames of "Inconel" and "Hasalloy". A preferred high-temperature resistant coating 53 is applied to both inner surface 55 and an outer surface 57 of legs 30 and 32 of flange 29 to avoid surface irregularities and to provide a low coefficient of friction. Preferred coatings include polytetrafluoroethene, sold under the registered tradename Teflon, and tungsten disulfide. A smooth low-friction surface is preferred to permit spring energized seal 34 and retaining ring 40 to alter their positions as required to assure proper deformation under load.

Ring 40 is preferably formed from a composite powdered metal and includes a high strength material zone 54 sandwiched between two outer relatively soft material zones 56. Having soft material zones 56 at the outer vertical extremities of ring 40 improves the ring's deformability under initial loading conditions. Each of the zones extends radially across the ring from face 51 to face 46. This aspect of the ring design is particularly important with high strength material zone 54, which provides much of the needed hoop strength. To provide this strength, high strength material zone 54 is thicker than corresponding zones 56. High strength material zone 54 preferably has a porosity of approximately 0 percent and relatively soft material zones 56 have a porosity between 3 and 60 percent and preferably between 15 and 30 percent porosity. As a result, ring 40 is impermeable to combustion gases.

The inventive multiple density zones provide numerous advantages, including the ability to vary the design strengths of the ring in both the vertical and hoop directions. A material yield strength for retaining ring 40 along the vertical axis preferably has a range between 10 and 120 kpsi; more preferably between 25 and 43 kpsi. A most preferred value is approximately 25 kpsi. This strength value provides a good secondary combustion seal around tile circumference of retaining ring 40. At the same time, however, it is preferable to have a yield strength along the hoop axis of between 100 and 200 kpsi, and more preferably between 100 and 160 kpsi. A most preferred value is approximately 160 kpsi to ensure that the retaining ring can withstand high internal cylinder pressures produced during engine operation, as well as the pressures exerted upon ring 40 by spring energized combustion seal 34.

Another advantage of using multiple density zones is that a variable spring rate may be more readily designed into the ring. Also, the stiffness along any selected axis may be varied as a function of retaining ring loading. Because of the convex top and bottom surfaces, initial assembly will result in point loading and local yielding of the retaining ring. This yielding will provide ring deformability to ensure a good initial seal around the circumference of the ring.

The variable spring rate may also be used to restrict further yielding. For example, as the vertical load is increased, ring 40 can be made to become stiffer, resisting thermal crushing while still providing a desirable combustion seal in a manner similar to that of a yieldable seal ring. The additional stiffness reduces the likelihood of plastic deformation, allowing the ring to recover its shape as a function of the Modulus of Elasticity.

Referring now to FIG. 3, a second embodiment annular retaining ring 60 includes a multiple layer laminate with a plurality of high strength material zones 62 alternating with a plurality of relatively soft material zones 64. As in the first embodiment, it is preferred that zones 62 and 64 extend radially from a face 66 at a radially inner extremity to a face 68 at a radially outer extremity of seal 60. Again, a relatively soft material zone is located at each vertical extremity 70 and 72 to assure the ring's deformability under initial loading conditions. The shape of ring 60 is similar to that of ring 40. However, in the embodiment shown, face 66 does not include a groove.

Preferably, retaining rings 40 and 60 are formed from a powdered metal that primarily comprises titanium. More preferably, the powdered metal includes between 2 and 6 percent aluminum, 1 and 6 percent vanadium, 0.5 and 4 percent iron and between 1 and 6 percent molybdenum. The aluminum and vanadium add to the titanium's structural strength. The combination of iron and molybdenum increase the strength of the powdered metal at high temperatures while simultaneously reducing the coefficient of friction of the composite metal at the retaining ring's outer surface. Most of the iron and molybdenum react with the rest of the powder, but some is deposited as a residue providing a lubricant. The lower coefficient of friction resulting from the lubricant is beneficial in overcoming the abrasive nature of pure titanium. On the other hand, if too much iron is used, the resulting material may be too brittle, reducing the deformability of the retaining ring.

One method of manufacture includes placing the composite powdered metal in a graphite fixture which is then heated using known sintering techniques. The type of fixture used and the method of heating can be controlled, as known to those skilled in the art, to result in a separation of the homogeneous powdered metal into desired material zones. Typically, a homogeneous composite metal is placed in a fixture and heated at preselected temperatures and times.

Although the disclosed zones are preferably achieved from a homogeneous material, distinct materials may also be laminated together to achieve the hard and soft zones.

Preferred embodiments of the present invention have been described. It is to be understood that variations and modifications may be employed without departing from the scope of the present invention. Accordingly, the following claims should be studied to determine the true scope of the present invention.

I claim:

1. A multiple sealing system for a cylinder head gasket, comprising:

a primary seal; and an annular secondary seal, said secondary seal positioned radially outwardly of and defining a radial axis, said secondary seal abutting said primary seal and including a radially elongate cross-section extending along said axis with two opposed outer surfaces each spaced away from said axis, said cross-section further comprising two annular faces centered on said axis, said faces defining radial extremities of said secondary seal, wherein said secondary seal is formed from a composite powdered metal having multiple density material zones of varying strength.

2. A multiple sealing system for a cylinder head gasket as recited in claim 1, said primary seal comprising an annular spring centered about an axis.

3. A multiple sealing system for a cylinder head gasket, comprising:

an annular primary seal; and an annular secondary seal positioned radially outwardly of and defining a radial axis, said secondary seal abutting said primary seal and including a radially elongate cross-section extending along said radial axis and having two opposed outer surfaces each spaced away from said axis, said cross-section further comprising two annular faces also centered on said axis, said faces defining radial extremities of said secondary seal, said secondary seal formed from a powdered metal alloy made up of titanium and an additional material to supply a lubricant to the finished secondary seal.

* * * * *